US007706536B2

(12) United States Patent
Dinu et al.

(10) Patent No.: US 7,706,536 B2
(45) Date of Patent: Apr. 27, 2010

(54) PHASE LOCKING IN A MULTI-CHANNEL QUANTUM COMMUNICATION SYSTEM

(75) Inventors: Mihaela Dinu, Freehold, NJ (US); Christophe J. Dorrer, Matawan, NJ (US); Clinton Randy Giles, Whippany, NJ (US); Inuk Kang, Eatontown, NJ (US); Dan Mark Marom, Howell, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1281 days.

(21) Appl. No.: 11/210,941

(22) Filed: Aug. 24, 2005

(65) Prior Publication Data

US 2006/0262930 A1 Nov. 23, 2006

Related U.S. Application Data

(60) Provisional application No. 60/681,726, filed on May 17, 2005.

(51) Int. Cl.
*H04K 1/00* (2006.01)
(52) U.S. Cl. .................................................. 380/256
(58) Field of Classification Search ................ 380/263, 380/256; 398/163
See application file for complete search history.

(56) References Cited

U.S. PATENT DOCUMENTS

| 4,989,200 | A |   | 1/1991  | Olshansky et al. ............ 370/3   |
|-----------|---|---|---------|--------------------------------------|
| 5,245,459 | A |   | 9/1993  | Faulkner et al. ............ 359/125  |
| 5,675,648 | A | * | 10/1997 | Townsend .................... 380/278 |
| 6,438,234 | B1|   | 8/2002  | Gisin et al. .................. 380/256|
| 6,801,626 | B1|   | 10/2004 | Nambu ........................ 380/256 |
| 7,085,499 | B2|   | 8/2006  | Yap et al. ..................... 398/183|
| 7,272,327 | B2|   | 9/2007  | Epworth et al. ............. 398/212  |
| 7,450,718 | B2| * | 11/2008 | Young et al. ................ 380/225  |
| 2004/0208643 | A1 | | 10/2004 | Roberts et al. .............. 398/186 |

(Continued)

OTHER PUBLICATIONS

"Quantum Cryptography," by N. Gisin, G. Ribordy, W. Tittel, and H. Zbinden, Reviews of Modern Physics, 2002, vol. 74, pp. 145-195.

(Continued)

*Primary Examiner*—Jung Kim
*Assistant Examiner*—Samson B Lemma
(74) *Attorney, Agent, or Firm*—Mendelsohn, Drucker, & Associates, P.C.; Yuri Gruzdkov; Steve Mendelsohn (57) ABSTRACT

A communication system adapted to use wavelength (frequency) division multiplexing for quantum-key distribution (QKD) and having a transmitter coupled to a receiver via a transmission link. In one embodiment, the receiver is adapted to (i) phase-shift a local oscillator (LO) signal generated at the receiver, (ii) combine the LO signal with a quantum-information (QI) signal received via the transmission link from the transmitter to produce interference signals, (iii) measure an intensity difference for these interference signals, and (iv) phase-lock the LO signal to the QI signal based on the measurement result. In one configuration, the QI signal has a plurality of pilot frequency components, each carrying a training signal, and a plurality of QKD frequency components, each carrying quantum key data. Advantageously, the system can maintain a phase lock for the QKD frequency components of the QI and LO signals, while the QKD frequency components of the QI signal continuously carry quantum key data.

53 Claims, 5 Drawing Sheets

U.S. PATENT DOCUMENTS

2005/0018724 A1    1/2005    Da Silva et al. ............... 372/32
2006/0018475 A1    1/2006    Vig et al. .................... 380/256

OTHER PUBLICATIONS

"Continuous Variable Quantum Cryptography Using Coherent States," F. Grosshans and P. Grangier, Physical Review Letters, 2002, vol. 88, No. 5, pp. 057902-1-057902-4.

"Reverse Reconciliation Protocols for Quantum Cryptography With Continuous Variables," by F. Grosshans and P. Grangier, arXiv:quant-ph\0204127 v1, Apr. 22, 2002, pp. 1-5.

"Quantum Computation and Quantum Information," by, M.A. Nielsen and I.L. Chuang, Cambridge University Press, 2000, pp. 582-603.

"Carrier Envelope Phase Control of Femtosecond Mode-Locked Lasers and Direct Optical Frequency Synthesis," by D.J. Jones, et al., Science vol. 288, 2000, pp. 635-639.

"Optical Clockworks and the Measurement of Laser Frequencies With a Mode-Locked Frequency Comb," by R. Holzwarth, et al. IEEE, Journal of Quantum Electronics, 2001, vol. 37, No. 12, pp. 1493-1501.

"Quantum Cryptography Using Pulsed Homodyne Detection," T. Hirano, et al. Physical Review A, 2003, vol. 68, pp. 42331-1-042331-7.

* cited by examiner

PHASE LOCKING IN A MULTI-CHANNEL QUANTUM COMMUNICATION SYSTEM

CROSS-REFERENCE TO RELATED APPLICATIONS

This application claims priority from U.S. Provisional Patent Application No. 60/681,726 filed May 17, 2005, and entitled "Quantum Key Distribution." The subject matter of this application is related to that of U.S. patent application Ser. No. 11/210,973, filed on the same date as the present application, and entitled "Multi-Channel Transmission of Quantum Information," which is incorporated herein by reference in its entirety.

BACKGROUND OF THE INVENTION

1. Field of the Invention

The present invention relates to optical communication equipment and, more specifically, to equipment for transmission of encrypted data using quantum cryptography.

2. Description of the Related Art

Cryptography is often used to exchange messages between two or more nodes (users, stations) in enhanced or even perfect privacy. A typical cryptographic method employs a publicly announced encrypting/decrypting algorithm, with the confidentiality of transmitted information provided by a secret key used in conjunction with that algorithm. Usually, a secret key is a randomly chosen, sufficiently long sequence of bits known only to the transmitting and receiving parties. For example, in a symmetric ciphering scheme, the transmitting station encrypts information using the secret key and sends the encrypted data over a public channel to the receiving station. The receiving station then uses the same key to undo the encryption and recover the original information.

It is well known that the longer the key, the more secure the system. For example, one widely used encryption system, the Data Encryption Standard (DES), has a key length of 56 bits. No method substantially more efficient than trying all $2^{56}$ possible values of the key is known for breaking the DES. However, it is still possible that, if an eavesdropper has substantial computational power, the DES can be defeated. Therefore, to achieve higher security, a one-time pad (i.e., a key that is as long as the transmitted message) can be used. Although a communication system employing one-time pads is theoretically secure against attacks based on sheer computational power, nevertheless, such a system has to deal with what is known as the key-distribution problem, i.e., the problem of securely furnishing keys to the transmitting/receiving stations.

With conventional (classical) key transmission methods, which can be subject to passive monitoring by an eavesdropper, it is relatively difficult to transmit a certifiably secret key, and cumbersome physical security measures are usually required. However, secure key distribution is possible with quantum techniques. More specifically, in quantum cryptography, a secret key is transmitted through a special quantum channel whose security is based on the principles of quantum mechanics. More specifically, it is known that any measurement of a suitably chosen quantum system inevitably modifies the quantum state of that system. Therefore, when an eavesdropper attempts to get information out of the quantum channel by performing a measurement, the fact that the measurement has been performed can be detected by legitimate users, who will then discard all compromised keys.

In practice, a quantum channel can be established using, e.g., (i) a train of single photons propagating through an optical fiber, with key bits encoded by the photon's polarization or phase, or (ii) a train of coherent optical pulses, each containing a small number (e.g., less than a few hundred) of photons, with key bits encoded by quadrature values of selected variables characterizing each pulse. More details on the establishment and use of representative quantum channels can be found, e.g., in a review article by N. Gisin, G. Ribordy, W. Tittel, and H. Zbinden, entitled "Quantum Cryptography," published in Reviews of Modern Physics, 2002, vol. 74, pp. 145-195, the teachings of which are incorporated herein by reference.

Although some progress has been made in developing equipment for quantum channels, this equipment is still not up to the performance targets, e.g., in quantum-key distribution (QKD) rate and transmission distance. For example, a current commercially available QKD system offers a QKD rate of about 1.5 kb/s over a single-mode optical fiber having a length of about 25 km. For comparison, a representative classical communication system offers a data transmission rate of about 10 Gb/s over an optical fiber having a length of about 1000 km. Given these parameters for the QKD and classical systems, one finds that significant improvements in QKD rate and/or transmission distance are desirable.

SUMMARY OF THE INVENTION

Problems in the prior art are addressed, in accordance with the principles of the present invention, by a communication system having a transmitter coupled to a receiver via a transmission link and adapted to use wavelength (frequency) division multiplexing for quantum-key distribution (QKD). In one embodiment, the receiver comprises an optical modulator (OM), a homodyne detector, and a signal processor. The OM is adapted to phase-shift a local oscillator (LO) signal generated at the receiver. The homodyne detector is adapted to (i) combine the LO signal with a quantum-information (QI) signal received via the transmission link from the transmitter to produce two interference signals and (ii) measure the intensity difference between these interference signals. The processor is adapted to process the measurement result to generate a control signal, which causes the phase shift(s) produced in the OM to establish a phase lock between the LO and QI signals. In one configuration, the QI signal has (i) a plurality of pilot frequency components, each carrying a training signal, and (ii) a plurality of QKD components, each carrying quantum key data; and the LO signal has corresponding pilot and QKD frequency components. The receiver is adapted to phase-lock the pilot frequency components of the QI and LO signals by phase-shifting each pilot frequency component of the LO signal using a reference phase shift determined for that frequency component based on the corresponding training signal of the QI signal. The receiver is further adapted to phase-lock the QKD frequency components of the QI and LO signals by phase-shifting each QKD frequency component of the LO signal using an approximated reference phase shift derived from the reference phase shifts for the pilot frequency components. Advantageously, a system of the invention can maintain a phase lock for the QKD frequency components of the QI and LO signals, while the QKD frequency components of the QI signal continuously carry quantum key data.

According to one embodiment, the present invention is a method of receiving quantum information at a receiver of a communication system having a transmitter coupled to the receiver via a transmission link, the method comprising: (A) receiving via the transmission link a quantum-information (QI) signal generated by the transmitter using a first optical source; and (B) phase-locking to the QI signal a local oscillator (LO) signal generated using a second optical source.

According to another embodiment, the present invention is a receiver for a communication system adapted for transmission of quantum information and having a transmitter coupled to the receiver via a transmission link, wherein the receiver is adapted to: (i) receive via the transmission link a quantum-information (QI) signal generated by the transmitter using a first optical source; and (ii) phase-lock to the QI signal a local oscillator (LO) signal generated using a second optical source.

According to yet another embodiment, the present invention is a communication system for transmission of quantum information, comprising a transmitter coupled to a receiver via a transmission link, wherein the receiver is adapted to: (i) receive via the transmission link a quantum-information (QI) signal generated by the transmitter using a first optical source; and (ii) phase-lock to the QI signal a local oscillator (LO) signal generated using a second optical source.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
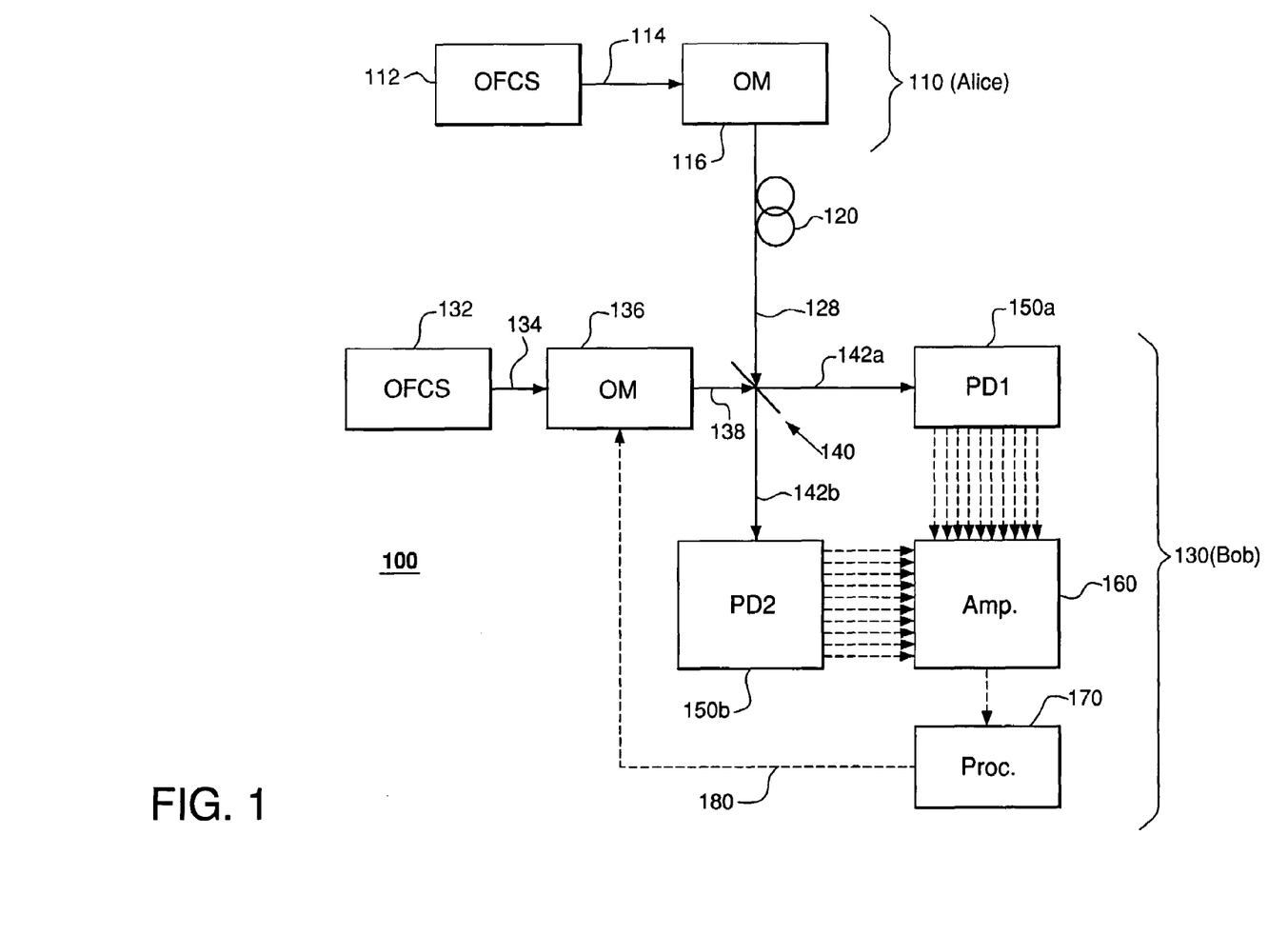
FIG. 1 schematically shows a multi-channel quantum communication system according to one embodiment of the invention.

FIG. 1 schematically shows a multi-channel quantum communication system 100 according to one embodiment of the invention. More specifically, system 100 is adapted to use wavelength (frequency) division multiplexing for quantum-key distribution (QKD). System 100 has a transmitter 110 (Alice) and a receiver 130 (Bob) coupled via a transmission link (e.g., an optical fiber) 120. Transmitter 110 has an optical-frequency comb source (OFCS) 112 coupled to an optical modulator (OM) 116. OFCS 112 generates an optical signal 114 having a plurality of uniformly spaced frequency components. OM 116 is a multi-channel optical modulator adapted to independently modulate each frequency component of signal 114 to produce a frequency-multiplexed quantum-information (QI) signal. This QI signal is applied by OM 116 to transmission link 120 and is received at receiver 130 as QI signal 128.

Receiver 130 has an OFCS 132 and an OM 136 that are generally analogous to OFCS 112 and OM 116, respectively, of transmitter 110. OFCS 132 generates an optical signal 134 having a plurality of uniformly spaced frequency components, and OM 136 independently modulates each component of signal 134 to produce a multiplexed local-oscillator (LO) signal 138. Each of optical-frequency comb sources 112 and 132 is independently referenced to a frequency standard (e.g., an atomic clock) such that signals 114 and 134 have substantially the same (common) set of frequencies. For example, in one embodiment, each of optical-frequency comb sources 112 and 132 provides a frequency comb, in which each frequency mode has (i) a spectral width of about 10 kHz or better and (ii) a center frequency located within about 100 Hz or less from a designated frequency defined with respect to the frequency standard. Such sources have been developed in recent years and can be implemented, e.g., using carrier-envelope-offset (CEO) locked lasers. As a result, QI signal 128 and LO signal 138 have frequency components belonging to substantially the same set of frequencies. However, one difference between signals 128 and 138 is that, the former has relatively low intensity suitable for QKD, while the latter has relatively high intensity. For example, in one configuration, QI signal 128 and LO signal 138 have intensities of about 1 and $10^6$ photons per pulse per component, respectively.

QI signal 128 and LO signal 138 are applied to an optical coupler 140 adapted to combine these signals and produce two interference signals 142a-b, each of which is a multi-component signal having the same set of frequencies as the QI and LO signals. Interference signals 142a-b are directed to photo-detectors 150a-b, respectively, each of which is a multi-channel photo-detector adapted to independently measure the intensity of each frequency component. In one embodiment, each of photo-detectors 150a-b comprises a de-multiplexer (DMUX) coupled to an array of photodiodes, with each photodiode in the array optically coupled to a separate output port of the DMUX. For each frequency component, the corresponding photodiode measures the component's intensity and applies the resulting electrical signal to an amplifier of an amplifier array 160. Each amplifier in array 160 is a differential amplifier configured to receive two electrical signals corresponding to the same frequency (channel) from photo-detectors 150a-b. As such, each amplifier in array 160 takes a difference between the received signals, amplifies it, and applies the amplified difference signal to a signal processor 170 for further processing. Together, optical coupler 140, photo-detectors 150a-b, and amplifier array 160 implement at receiver 130 a multi-channel homodyne detection scheme. For each frequency component of QI signal 128, this homodyne detection scheme provides quadrature measurements, from which quantum-bit values carried by the QI signal can be ascertained.

Figure 2:
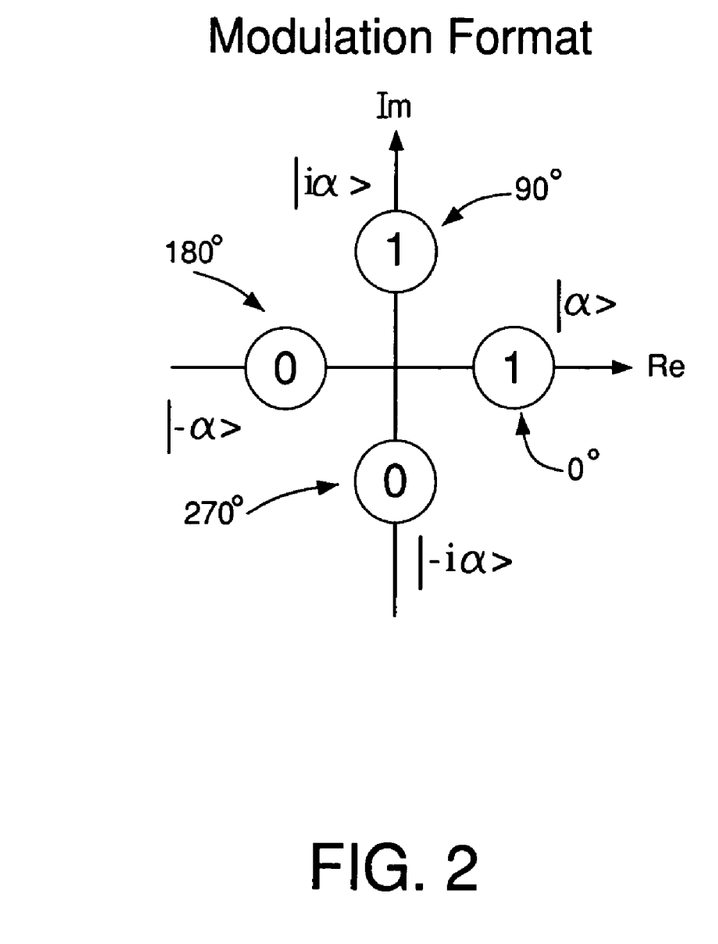
FIG. 2 graphically shows a phase-modulation format that can be used in the system of FIG. 1 according to one embodiment of the invention.

FIG. 2 graphically shows a phase-modulation format that can be used in system 100 according to one embodiment of the invention. More specifically, transmitter 110 (Alice) encodes quantum-bit values onto the QI signal applied to transmission link 120 by randomly applying in OM 116 a phase shift of 0, 90, 180, or 270 degrees to each frequency component of signal 114, with the phase shifts of 0 and 90 degrees associated with the binary "1" and the phase shifts of 180 and 270 degrees associated with the binary "0". For each quantum bit, in addition to encoding the bit value, the phase shift also determines Alice's basis set selection for that bit. For example, the modulation format of FIG. 2 has two orthogonal basis sets, with one basis set having the phase-shift states lying along the real (Re) axis (i.e., the 0- and 180-degree states) and the other basis set having the phase-shift states lying along the imaginary (Im) axis (i.e., the 90- and 270-degree states). Thus, if Alice selects one of the 0- and 180-degree phase shifts, Alice has selected the basis set corresponding to the real axis. Alternatively, if Alice selects one of the 90- and 270-degree phase shifts, Alice has selected the orthogonal basis set (i.e., that corresponding to the imaginary axis). At receiver 130 (Bob), the quantum-bit values carried by QI signal 128 are ascertained by randomly applying in OM 136 a phase shift of 0 or 90 degrees to each frequency component of signal 134 and then using the resulting LO oscillator signal 138 to implement the above-described homodyne detection scheme. For each quantum bit, the phase shift applied in OM 136 similarly determines Bob's basis set selection for that bit.

Figure 3A:
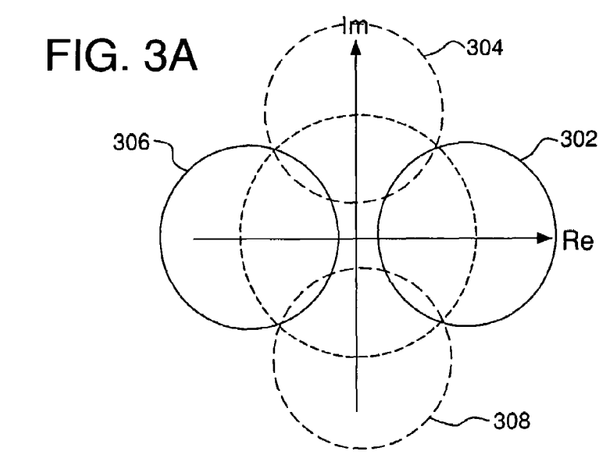
FIGS. 3A-C graphically illustrate representative homodyne-detection statistics at the receiver of the system shown in FIG. 1 for the modulation format of FIG. 2, when the local-oscillator (LO) signal is appropriately phase-locked to the quantum-information (QI) signal.
Figure 3B:
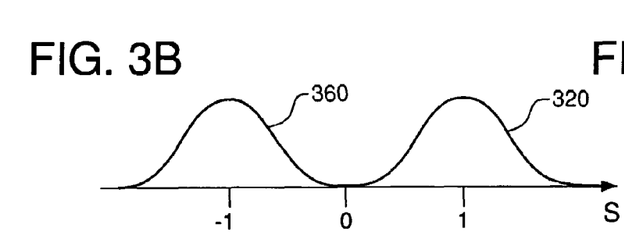
Figure 3C:
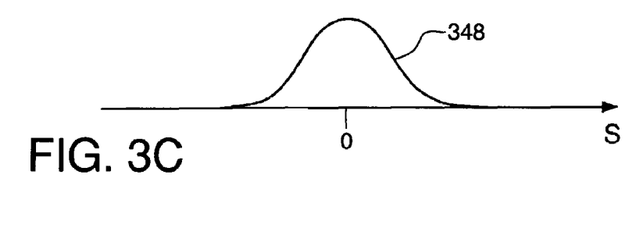

FIGS. 3A-C graphically illustrate representative homodyne-detection statistics at receiver 130 for the modulation format shown in FIG. 2, when LO signal 138 is appropriately phase-locked to QI signal 128. More specifically, FIG. 3A shows a constellation diagram, with four circles 302, 304, 306, and 308 encapsulating the most probable areas into which phase vectors corresponding to Alice's quantum bits carried by QI signal 128 might fall. The areas indicated by these circles are relatively large because (1) QI signal 128 is affected by quantum fluctuations and (2) the phase vectors are additionally scattered by the noise in system 100. If Alice has selected the real (Re) basis set for a particular quantum bit, then the phase vector corresponding to that bit is most likely to fall into circle 302, when the quantum bit is "1," or into circle 306, when the quantum bit is "0." Alternatively, if Alice has selected the imaginary (Im) basis set, then the phase vector corresponding to the bit is most likely to fall into circle 304, when the quantum bit is "1," or into circle 308, when the quantum bit is "0." Bob's homodyne detection scheme implemented in receiver 130 is substantially equivalent to measuring a projection of the received phase vector onto Bob's selected basis set (Re or In). If averaged over a sufficiently large number of quantum bits, the normalized output of each amplifier in array 160 is described by the probability distribution functions, e.g., similar to those shown in FIGS. 3B-C.

If Bob's selected basis set coincides with Alice's basis set, then taking a projection onto that basis set constitutes a measurement of possible quantum bit values. Curves 320 and 360 shown in FIG. 3B represent the probability distribution functions that describe the normalized amplifier output when Alice and Bob select the same basis set. More specifically, curve 320 represents the probability distribution function corresponding to "1" bits, and curve 360 represents the probability distribution function corresponding to "0" bits. Curves 320 and 360 have Gaussian-like shapes and are centered at (i.e., have a distribution average of) 1 and −1, respectively. Note that Bob can differentiate between binary "ones" and "zeros" because curves 320 and 360 are different and well separated from one another. Hence, this situation is often referred to as a "correct basis set selection" by Bob.

If Bob's selected basis set differs from Alice's basis set, then taking a projection onto Bob's basis set does not constitutes a measurement of possible quantum bit values. Curve 348 shown in FIG. 3C represents the probability distribution functions that describe the normalized amplifier output when Alice and Bob select different basis sets. Note that, in contrast to FIG. 3B, now a single curve (curve 348) represents both probability distribution functions, i.e., the probability distribution function corresponding to "1" bits and the probability distribution function corresponding to "0" bits overlap, with the curve being Gaussian-like and centered at 0. Due to this probability-distribution-function degeneracy, Bob cannot differentiate between binary "ones" and "zeros," and the situation of FIG. 3C is often referred to as an "incorrect basis set selection" by Bob.

If both Alice and Bob randomly chose their basis sets for each bit, then the resulting probability distribution function measured by Bob is a triple-humped curve similar to the curve representing a sum of curves 320, 348, and 360 (FIGS. 3B and 3C). The individual probability distribution functions represented by each of curves 320, 348, and 360 can be obtained in a training mode, as described in more details below.

In one configuration, based on the detection statistics illustrated in FIGS. 3B-C, receiver 130 (Bob) interprets the measurement results as follows. Signal processor 170 establishes two threshold values, $X_+$ and $X_-$ for each channel, where $X_- \leq X_+$, with the $X_-$ and $X_+$ values being the same or different for different channels. If the normalized amplifier output, $X_n$, for the channel is greater than $X_+$, then Bob judges the corresponding quantum bit as a "1" bit. If $X_n$ is smaller than $X_-$ then Bob judges the quantum bit as a "0" bit. If $X_n$ is between $X_+$ and $X_-$ then Bob gets an inconclusive result and abandons the judgment. In one configuration, $X_+=X_-=0$ for each channel.

After an appropriate number of quantum bits have been transmitted from Alice to Bob, Bob tells Alice, via an authenticated public channel established, e.g., over a conventional telephone or computer network, his basis set choices, and Alice tells Bob which basis set choices were correct. Bob then retains the judgments corresponding to the correct basis set choices, while discarding the judgments corresponding to the incorrect basis set choices, to compile a sifted quantum key (also referred to as a raw key). Finally, Alice and Bob carry out error correction and privacy amplification procedures with the sifted quantum key to distill a secure quantum key. Additional information on representative error correction and privacy amplification procedures can be found, e.g., in (1) F. Grosshans and P. Grangier, Phys. Rev. Letters, 2002, vol. 88, N. 5, p. 057902; (2) F. Grosshans and P. Grangier, arXiv: quant-ph/0204127 v1, 22 Apr. 2002; and (3) M. A. Nielsen and I. L. Chuang, "Quantum Computation and Quantum Information," Cambridge University Press (2000), pp. 582-603, the teachings of all of which are incorporated herein by reference.

Figure 4A:
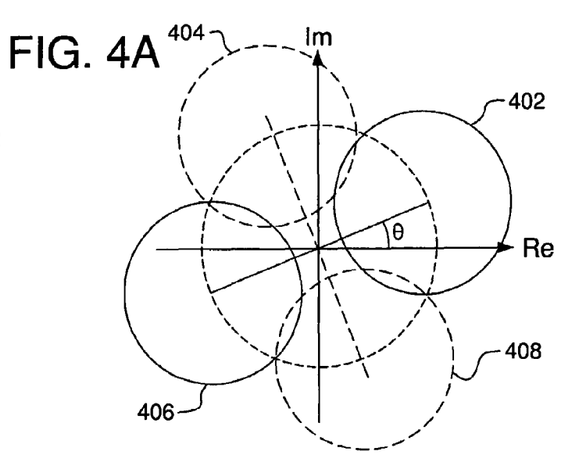
FIGS. 4A-C graphically illustrate representative homodyne-detection statistics at the receiver of the system shown in FIG. 1 for the modulation format of FIG. 2, when there is a phase-lock error between the LO and QI signals.
Figure 4B:
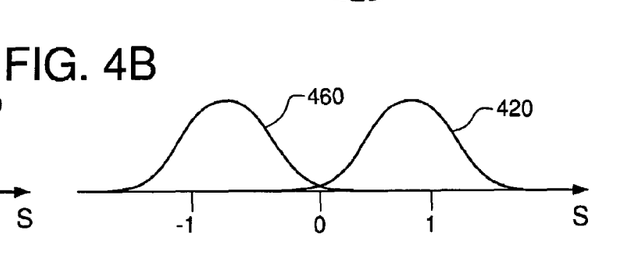
Figure 4C:
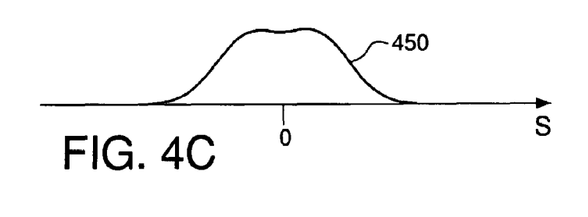

FIGS. 4A-C graphically illustrate representative homodyne-detection statistics at receiver 130 for the modulation format shown in FIG. 2, when there is a phase-lock error between LO signal 138 and QI signal 128. FIGS. 4A-C are generally analogous to FIGS. 3A-C, respectively, with analogous figure elements designated by the labels having the same last two digits. As seen in FIG. 4A, a phase-lock error of θ degrees causes rotation about the center of coordinates, by angle θ, of the most probable areas into which Alice's phase vectors fall with respect to Bob's coordinate system. In the situation when Bob chooses the same basis set as Alice, curves 420 and 460 (FIG. 4B) are closer to each other than curves 320 and 360 (FIG. 3B) and are no longer centered at 1 and −1, respectively. In the situation when Bob chooses a basis set different from that selected by Alice, the rotation causes degeneracy lifting for the probability-distribution-function degeneracy of FIG. 3C. More specifically, when Alice and Bob select different basis sets with the phase-lock error present, the probability distribution functions corresponding to the "1" and "0" bits are no longer represented by overlapping curves analogous to curve 348 of FIG. 3C. Instead, these two probability distribution functions are represented by two different curves (not shown in FIG. 4C) analogous to curves 420 and 460 of FIG. 4B, but having a relatively small separation between them. FIG. 4C shows a curve 450 that represents a cumulative probability distribution functions for the two quantum bit values. Curve 450 has a doublet shape, which is a signature of degeneracy lifting.

Comparing FIG. 4B with FIG. 3B, one finds that curves 420 and 460 have a greater overlap than curves 320 and 360. This increased overlap is likely to increase the number of judgment errors for Bob because there is an increased probability that (i) $X_n > X_+$, when Alice transmits a "0" bit and (ii) $X_n < X_-$ when Alice transmits a "1" bit. To keep the number of judgment errors relatively low, it is therefore desirable that a proper phase-lock, e.g., illustrated in FIG. 3, is maintained in system 100 between LO signal 138 and QI signal 128.

Briefly referring back to FIG. 1, processor 170 of receiver 130 is adapted to produce a control signal 180 applied to OM 136. Based on control signal 180, OM 136 establishes a reference phase shift for each frequency component of LO signal 138 to properly phase-lock that component to the corresponding frequency component of QI signal 128. The random phase shifts of 0 and 90 degrees applied in OM 136 to each frequency component during QKD transmission are then applied with respect to the reference phase shift established for that component. A method of generating control signal 180 in accordance with representative embodiments of the invention is described in more detail below.

Figure 5:
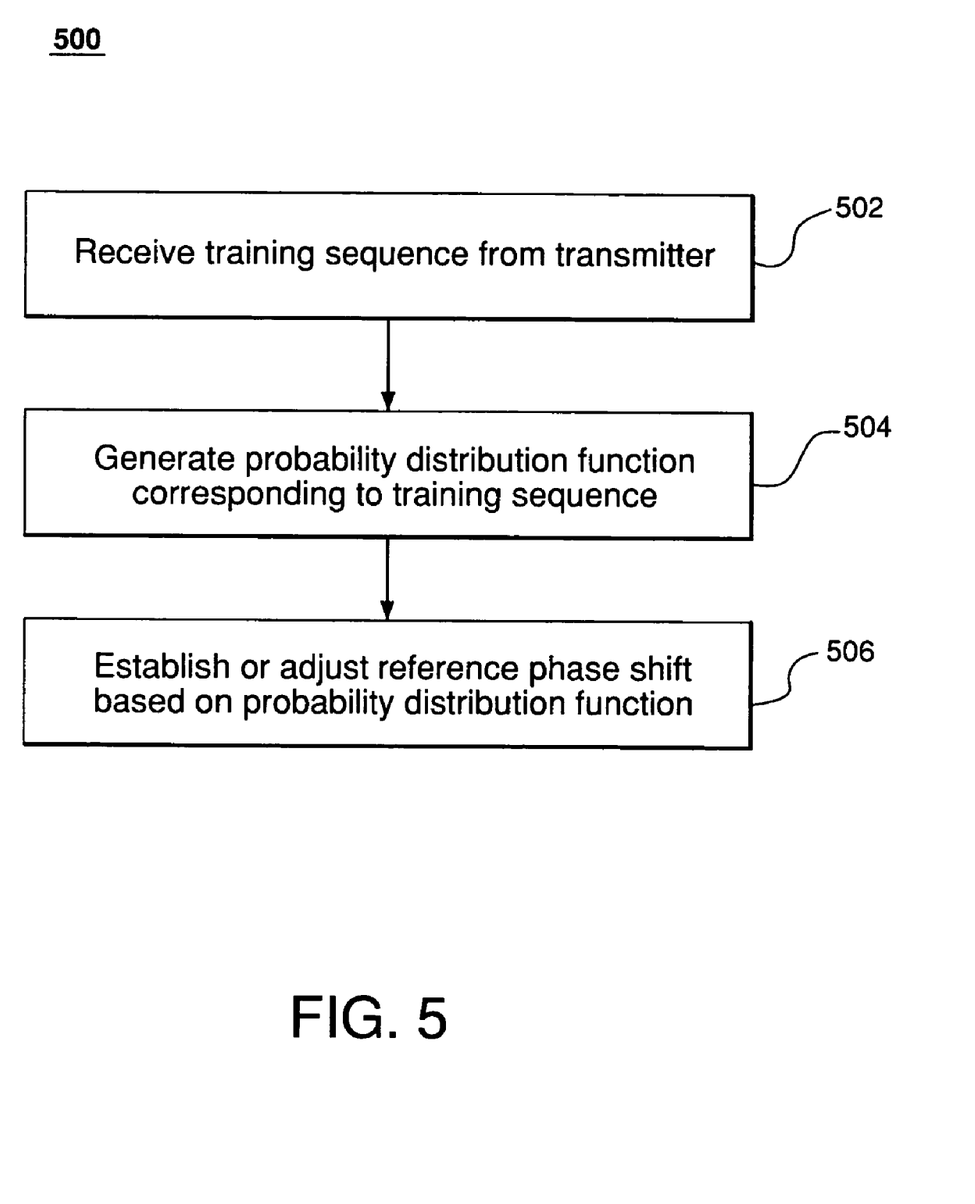
FIG. 5 shows a method of phase-locking the LO signal to the QI signal at the receiver of the system shown in FIG. 1 according to one embodiment of the invention.

FIG. 5 shows a method 500 of generating control signal 180 at receiver 130 of system 100 according to one embodiment of the invention. At step 502 of method 500, transmitter 110 and receiver 130 of system 100 are configured to transmit and receive, respectively, a training signal having a training sequence of bits. In general, a training sequence can include any predetermined combination of bits known to both transmitter 110 and receiver 130 and transmitted using a known basis set selection. For example, in one configuration, the training sequence comprises a string of binary "ones" encoded in the modulation format of FIG. 2 with a 0-degree phase shift. In general, the training sequence is sufficiently long (e.g., 1000 bits) for processor 170 to have enough data to generate a probability distribution function, e.g., similar to one of those shown in FIGS. 3 and 4. The training sequence may be transmitted on each frequency (channel) of system 100 or on selected few pilot frequencies (channels). When only pilot frequencies are used for the training sequence transmission, other frequencies (referred hereafter as QKD frequencies) may continue to be utilized for regular quantum-key data transmission in parallel with the training sequence transmission. In a representative configuration, system 100 has one pilot frequency for every nine QKD frequencies.

At step 504 of method 500, processor 170 processes quadrature measurement results for each of the frequencies utilized in the training sequence transmission to generate, for each of those frequencies, a corresponding probability distribution function. In one configuration, processor 170 may employ sliding-window processing to track the probability distribution function for each frequency over time. For example, suppose that the string of bits in the training sequence is 1000 bits long. Then, processor 170 can be configured to generate (i) a first probability distribution function based on the quadrature measurement results corresponding to 1-st to 100-th bits, (ii) a second probability distribution function based on the quadrature measurement results corresponding to 11-th to 110-th bits, (iii) a third probability distribution function based on the quadrature measurement results corresponding to 21-st to 120-th bits, etc. As a result, for the entire training sequence of 1000 bits, processor 170 generates 91 probability distribution functions which, when taken together, reflect time evolution of the link and channel conditions and/or any phase-shift adjustments made in OM 136.

At step 506 of method 500, processor 170 evaluates, for each frequency, the probability distribution function(s) generated at step 504. Such evaluation may include determining a distribution average, median, full width at the half-maximum (FWHM), etc. Based on this evaluation, processor 170 generates control signal 180, which instructs OM 136 to set or adjust a reference phase shift value for each frequency to properly phase-lock the corresponding components of LO signal 138 and QI signal 128. In one configuration, processor 170 uses the above-described sliding-window processing to track the phase-lock between LO signal 138 and QI signal 128 in (quasi-)real time.

In a system configuration that utilizes all frequencies for the training sequence transmission, system 100 periodically switches between the training and QKD modes of operation. In a training mode, system 100 establishes a phase lock for each frequency, e.g., as described above. In a QKD mode, system 100 uses the phase lock established during the training mode to transmit quantum-key data on all frequencies. The periodicity of mode switching in system 100 is typically governed by the condition of transmission link 120. For example, when ambient temperature along transmission link 120 is relatively stable, mode switching in system 100 can occur relatively infrequently. In contrast, when ambient temperature along transmission link 120 is subject to relatively strong fluctuations, mode switching in system 100 can occur more often. Note that a QKD protocol might include error-rate monitoring as a part of its error-correction and privacy-amplification routine, which enables dynamic adjustment of the periodicity of mode switching when the quality of the transmission link varies over time.

In a system configuration that utilizes pilot frequencies for the training sequence transmission, processor 170 preferably tracks the phase lock between the LO signal 138 and QI signal 128 for each of the pilot frequencies in real time. For all other signal frequencies, processor 170 determines the reference phase shifts (preferably also in real time) by approximation (e.g., interpolation and/or extrapolation) from the current reference phase-shift values for the pilot frequencies. For example, in one configuration, processor 170 treats the reference phase shift values determined for the pilot frequencies as a set of discrete samples of a continuous function that describes frequency dependence of reference phase shifts for all signal frequencies. Processor 170 then computes that continuous function using a selected fitting technique (e.g., spline fitting) and samples the computed function at appropriate frequencies to determine reference phase shifts for the signal frequencies other than the pilot frequencies.

If appropriate or necessary, system 100 can be configured to change a current allocation of signal frequencies as pilot and QKD frequencies to a different allocation. For example, for relatively stable link conditions, a relatively small number of signal frequencies can be designated as pilot frequencies, e.g., to increase the total QKD capacity of system 100. In contrast, for relatively unstable link conditions, a relatively large number of signal frequencies can be designated as pilot frequencies, e.g., to improve the accuracy of phase-lock tracking for the QKD frequencies. Frequency intervals between neighboring pilot frequencies do not have to be the same across the bandwidth of system 100. Depending on the particular conditions, certain spectral regions may be allocated fewer or more pilot frequencies per unit bandwidth than other spectral regions and/or system 100 as a whole.

FIGS. 6A-C and 7A-C graphically illustrate representative implementations of method 500. More specifically, FIGS. 6A-C graphically illustrate representative homodyne-detection statistics at receiver 130 for a channel of system 100 configured to transmit a training sequence, when LO signal 138 is appropriately phase-locked to QI signal 128. Similarly, FIGS. 7A-C graphically illustrate representative homodyne-detection statistics for that channel, when there is a phase-lock error between LO signal 138 and QI signal 128. FIGS. 6A-C and 7A-C are generally analogous to FIGS. 3A-C and 4A-C, respectively, with analogous figure elements designated by the labels having the same last two digits. The training sequence corresponding to FIGS. 6A-C and 7A-C comprises a string of binary "ones" encoded in the modulation format of FIG. 2 with a 0-degree phase shift (Re basis).

Figure 6A:
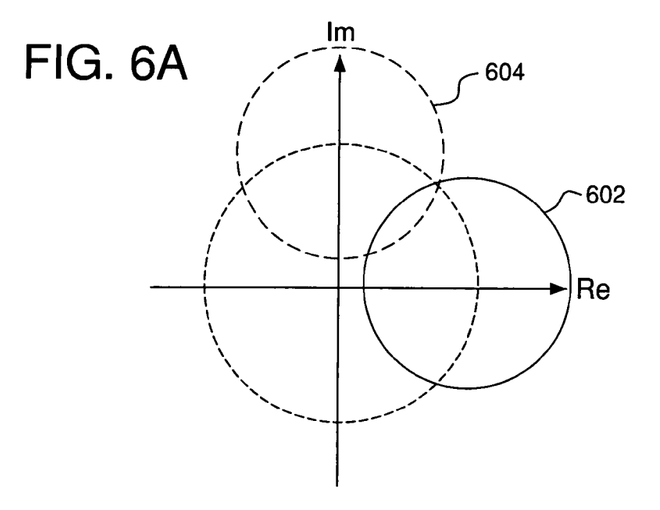
FIGS. 6A-C and 7A-C graphically illustrate representative implementations of the method shown in FIG. 5.
Figure 6B:
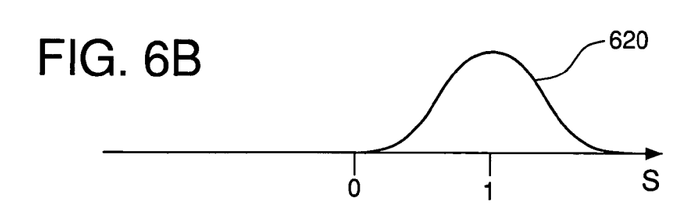
Figure 6C:
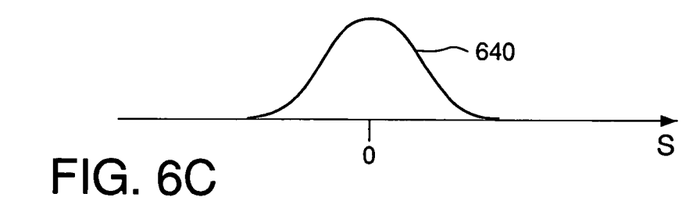

Referring to FIG. 6, since the training sequence only has binary "ones," Alice's phase vectors substantially fall into circle 602. Since Bob knows which basis set Alice is using for the training sequence, Bob has total control over whether he chooses the same basis set as Alice or a different one. Curve 620 (FIG. 6B) represents a probability distribution function generated at step 504 of method 500, if Bob decides to select the same basis set as Alice (i.e., the Re basis). Similarly, curve 640 (FIG. 6C) represents a probability distribution function generated at step 504, if Bob decides to select a different basis set than Alice (i.e., the Im basis). Curves 620 and 640 have Gaussian-like shapes and distribution averages of 1 and 0, respectively.

Figure 7A:
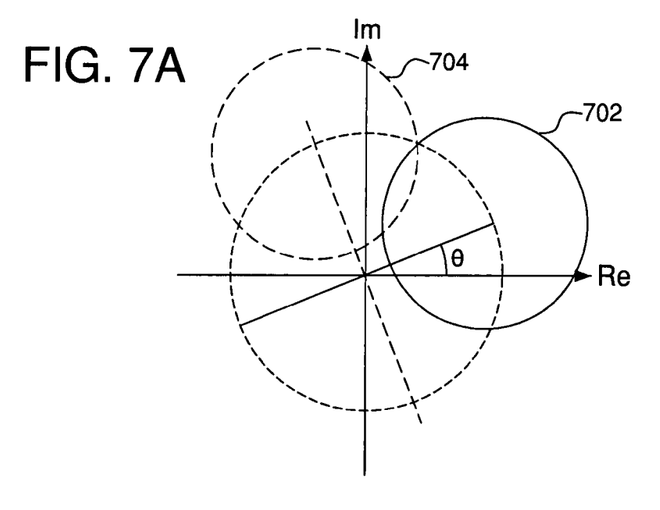
Figure 7B:
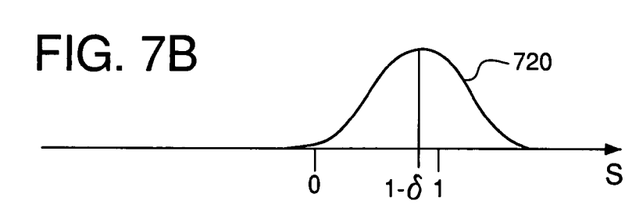
Figure 7C:
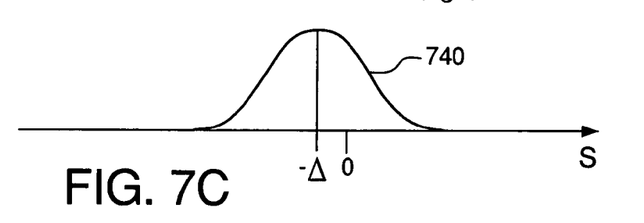

Referring to FIG. 7A, a phase-lock error of $\theta$ degrees causes a phase-diagram rotation similar to that shown in FIG. 4A. Now curve 720 (FIG. 7B) represents a probability distribution function generated at step 504 of method 500, if Bob decides to select the same basis set as Alice, and curve 740 (FIG. 7C) represents a probability distribution function generated at that step, if Bob decides to select a different basis set. Due to the phase-diagram rotation (FIG. 7A), curves 720 (FIG. 7B) and 740 (FIG. 7C) have distribution averages of $(1-\delta)$ and $-\Delta$, respectively, where $\delta=1-\cos\theta$ and $\Delta=\sin\theta$. Thus, for either basis set selection, Bob is able to detect a phase-lock error by measuring a deviation of the distribution average from (or equivalently displacement of the corresponding probability distribution function with respect to) 1 and 0, respectively. However, it is more advantageous for Bob to generate control signal 180 based on the value of $\Delta$ than that of $\delta$, because (1) the displacement of curve 740 is measured with respect to zero and, therefore, the effect of possible normalization errors on the value of $\Delta$ is relatively small, (2) the sign of $\Delta$ can distinguish negative and positive values of $\theta$, while $\delta$ cannot, and (3) for small values of $\theta$, $\Delta$ is significantly larger than $\delta$. As a result, receiver 130 (Bob) is likely to achieve a better phase lock (i.e., a smaller phase-lock error) when processor 170 generates control signal 180 based on $\Delta$, rather than $\delta$.

Based on this observation, in one configuration, system 100 might implement method 500 as follows. For step 502, receiver 130 (Bob) is configured to select a basis set orthogonal to that selected at transmitter 110 (Alice) for each frequency utilized in the training sequence transmission. For step 504, processor 170 is configured to generate probability distribution functions, e.g., using the above-described "sliding-window" processing. For step 506, processor 170 is configured to generate control signal 180 such that the distribution average for each frequency utilized for the training sequence transmission is nulled. The phase shift in OM 136 corresponding to a null of the distribution average for a particular frequency is then designated as a reference phase shift for that frequency. Processor 170 is configured to appropriately adjust, in real time, control signal 180 based on the "sliding-window" processing of step 504 to continuously track the nulls of the distribution averages, thereby appropriately adjusting the reference phase shifts.

Note that this implementation of method 500 results in reference phase shifts that produce a 90-degree phase shift for each frequency component of LO signal 138 with respect to a corresponding frequency component of QI signal 128. Consequently, the random phase shifts applied by OM 136 to each frequency component during regular QKD transmission are selected from −90 and 0 degrees with respect to the reference phase shift to obtain the phase shifts of 0 and 90 degrees, respectively, with respect to the 0-degree phase shift of the modulation format shown in FIG. 2.

When transmission of QI signal 128 (FIG. 1) is first initiated, receiver 130 (Bob) has no initial knowledge of the phases of the incoming signal. To acquire this initial knowledge, receiver 130 is configured to calibrate OM 136, i.e., to determine a correspondence between a phase shift introduced in the OM and the phase of the incoming QI signal. In one configuration, receiver 130 performs a calibration procedure, which involves, for each frequency component, performing a scan of phase shift values introduced by OM 136 into LO signal 138 over a phase shift interval of, e.g., $2\pi$, using sufficiently small increments of the relative phase shift, while receiving a training signal and tracking the value of the corresponding distribution average. The resulting scan curve showing the distribution average as a function of the introduced phase shift should have two nulls, which can serve as calibration points for OM 136. Receiver 130 (Bob) can then initialize the LO phases in accordance with the results of the scan(s) and start tracking phase-lock errors, e.g., as already described above.

In one configuration, system 100 can reduce the amount of time spent on training sequence measurements as follows. System 100 can temporarily increase the number of photons in the training signal(s), under the limitation that such an increase does not substantially increase linear and/or nonlinear cross-talk among different frequency channels. Such an increase helps receiver 130 to measure the probability distribution function(s) in fewer time slots, thereby reducing the overall training time.

In addition, receiver 130 can be configured to combine the results of training signal measurements for multiple pilot channels after the initial phase lock has been established. More specifically, if the combined spectral spread of all quantum channels is relatively small (e.g., about 1 nm) and/or the length of transmission link 120 is relatively short, then temporal phase variations for all channels due to refractive index variations in the transmission link can be assumed to be correlated such that all multiple pilot channels are collectively described by a single probability distribution function. Consequently, receiver 130 can be configured to use a single global phase shifter configured to introduce the same phase adjustment across all quantum channels at the same time, thereby simplifying the process of maintaining the phase lock between the QI and LO signals. On the other hand, if the combined spectral spread of all quantum channels is relatively large and/or the length of transmission link 120 is relatively long, temporal phase variations for different channels are distinct and unique. As a result, while still being correlated, the phases corresponding to different quantum channels need to be adjusted separately.

While this invention has been described with reference to illustrative embodiments, this description is not intended to be construed in a limiting sense. For example, system 100 can be configured to operate using various QKD protocols, e.g., without limitation, a BB84 protocol, a B92 protocol, or a continuous-variable protocol. Although embodiments of the invention have been described in reference to phase modulation, one skilled in the art will appreciate that the invention can also be adapted for use with polarization modulation or modulation of any other suitable parameter of an optical signal. Location of the light source used for the production of a LO signal is not necessarily limited to the receiver (Bob) and, in one embodiment, said light source can be located at the transmitter (Alice) or at other suitable location. Although embodiments of the invention have been described in reference to QKD transmission, one skilled in the art will appreciate that the invention can also be used in other applications employing transmission of quantum information, e.g., quantum authentication procedures, secure financial transactions (quantum money), quantum games (optimal decision making in group negotiations), etc. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. A method of receiving quantum information at a receiver of a communication system having a transmitter coupled to the receiver via a transmission link, the method comprising:
    (A) receiving via the transmission link a quantum-information (QI) signal generated by the transmitter using a first optical source;
    (B) phase-locking to the QI signal a local oscillator (LO) signal generated using a second optical source;
    (C) combining the LO signal and the QI signal to produce first and second interference signals;
    (D) measuring an intensity difference between the first and second interference signals; and
    (E) phase-shifting the LO signal based on the measurement result to achieve the phase lock.

2. The invention of claim 1, wherein:
    for step (A), the QI signal comprises a training signal; and step (B) comprises:
        determining a reference phase shift for the LO signal based on the training signal; and
        phase-shifting the LO signal using the reference phase shift to achieve the phase lock.

3. The invention of claim 2, wherein step (B) comprises:
    generating a probability distribution function corresponding to the training signal; and
    determining the reference phase shift based on the probability distribution function.

4. The invention of claim 3, wherein step (B) comprises:
    generating a plurality of probability distribution functions corresponding to the training signal using sliding-window processing; and
    adaptively adjusting the reference phase shift based on said plurality of probability distribution functions.

5. The invention of claim 3, wherein step (B) comprises:
    determining a distribution average for the probability distribution function; and
    determining the reference phase shift based on the distribution average.

6. The invention of claim 5, comprising adaptively tracking a null of the distribution average.

7. The invention of claim 2, wherein the training signal comprises a known sequence of bits encoded using a known basis-set selection.

8. The invention of claim 7, wherein:
    the known sequence of bits corresponds to a first basis set and a single bit value; and
    step (B) comprises selecting a second basis set, different from the first basis set, for the determination of the reference phase shift.

9. The invention of claim 1, comprising compiling a quantum key based on the QI signal, wherein the QI signal comprises a signal having quantum key data.

10. The invention of claim 1, wherein each of the QI and LO signals has a plurality of frequency components, wherein at least one frequency component of the LO signal is phase-locked to a corresponding frequency component of the QI signal.

11. The invention of claim 10, wherein each frequency component of the QI signal alternates between carrying a training signal and a signal having quantum key data.

12. The invention of claim 11, wherein, for at least a first period of time, all frequency components of the QI signal carry training signals and, for at least a second period of time, all frequency components of the QI signal carry signals having quantum key data.

13. The invention of claim 1, wherein:
    for step (A), the QI signal has one or more pilot frequency components, each characterized by a corresponding optical frequency, wherein each pilot frequency component carries a training signal;
    for step (B), the LO signal has one or more pilot frequency components having the one or more optical frequencies;
    for each pilot frequency component of the LO signal, step (B) comprises:
        determining a reference phase shift based on the training signal; and
        phase-shifting the pilot frequency component of the LO signal using the reference phase shift.

14. The invention of claim 13, wherein, for at least one frequency component of the LO signal having a signal frequency other than one of the optical frequencies of the one or more pilot frequency components, step (B) comprises determining a reference phase shift based on the one or more reference phase shifts determined for the one or more pilot frequency components of the LO signal.

15. The invention of claim 13, wherein, in addition to the one or more pilot frequency components, each of the QI and LO signals has one or more quantum-key-distribution (QKD) frequency components, wherein the method comprises receiving quantum key data, in parallel with the one or more training signals, using said QKD frequency components.

16. The invention of claim 15, comprising changing over time allocation of a frequency component as a pilot or QKD frequency component.

17. The invention of claim 16, comprising changing the allocation based on a condition of the transmission link.

18. A communication system for transmission of quantum information, comprising a transmitter coupled to a receiver via a transmission link, wherein:

the receiver is adapted to:
- receive via the transmission link a quantum-information (QI) signal generated by the transmitter using a first optical source; and
- phase-lock to the QI signal a local oscillator (LO) signal generated using a second optical source; and the receiver comprises:
- an optical modulator adapted to phase-shift the LO signal;
- a detector adapted to (i) combine the LO signal with the QI signal to produce first and second interference signals and (ii) measure an intensity difference between the first and second interference signals; and
- a processor adapted to process the measurement result to generate a control signal, which configures the optical modulator to phase-shift the LO signal to achieve the phase lock.

19. The invention of claim 18, wherein each of the first and second optical sources is referenced to a frequency standard.

20. The invention of claim 18, wherein:
the QI signal comprises a training signal; and
the processor is adapted to (i) determine a reference phase shift for the LO signal based on a measurement result corresponding to the training signal and (ii) configure the optical modulator to phase-shift the LO signal using the reference phase shift.

21. The invention of claim 20, wherein the processor is configured to:
generate a probability distribution function corresponding to the training signal; and
determine the reference phase shift based on the probability distribution function.

22. The invention of claim 21, wherein the processor is configured to:
generate a plurality of probability distribution functions corresponding to the training signal using sliding-window processing; and
adjust the reference phase shift in real time based on said plurality of probability distribution functions.

23. The invention of claim 21, wherein the processor is configured to:
determine a distribution average for the probability distribution function; and
determine the reference phase shift based on the distribution average.

24. The invention of claim 23, the processor is configured to adaptively track a null of the distribution average.

25. The invention of claim 20, wherein, the training signal comprises a known sequence of bits encoded using a known basis-set selection.

26. The invention of claim 18, wherein:
the QI signal has one or more pilot frequency components, each characterized by a corresponding optical frequency, wherein each pilot frequency component carries a training signal;
the LO signal has one or more pilot frequency components having the one or more optical frequencies;
for each pilot frequency component of the LO signal, the processor is adapted to:
- determine a reference phase shift based on a measurement result corresponding to the training signal; and
- configure the OM to phase shift the pilot frequency component of the LO signal using the reference phase shift.

27. The invention of claim 26, wherein, for at least one frequency component of the LO signal having a signal frequency other than one of the optical frequencies of the one or more pilot frequency components, the processor is adapted to determine a reference phase shift based on the one or more reference phase shifts determined for the one or more pilot frequency components of the LO signal.

28. The invention of claim 26, wherein, in addition to the one or more pilot frequency components, each of the QI and LO signals has one or more quantum-key-distribution (QKD) frequency components, wherein the receiver is adapted to receive quantum key data, in parallel with the one or more training signals, using the QKD frequency components.

29. The invention of claim 28, wherein the system is adapted to change over time allocation of a frequency component as a pilot or QKD frequency component.

30. The invention of claim 29, wherein the allocation is changed based on a condition of the transmission link.

31. The invention of claim 18, wherein the receiver is adapted to compile a quantum key based on the QI signal, wherein the QI signal comprises a signal having quantum key data.

32. The invention of claim 18, wherein each of the QI and LO signals has a plurality of frequency components, wherein at least one frequency component of the LO signal is phase-locked to a corresponding frequency component of the QI signal.

33. The invention of claim 32, wherein each frequency component of the QI signal alternates between carrying a training signal and a signal having quantum key data.

34. The invention of claim 33, wherein, for at least a first period of time, all frequency components of the QI signal carry training signals and, for at least a second period of time, all frequency components of the QI signal carry signals having quantum key data.

35. A receiver for a communication system adapted for transmission of quantum information and having a transmitter optically coupled to the receiver, wherein the receiver is adapted to:
- receive a quantum-information (QI) signal generated by the transmitter using a first optical source; and
- phase-lock to the QI signal a local oscillator (LO) signal generated using a second optical source, wherein:
  - the QI signal is a frequency-multiplexed QI signal having a first plurality of independently modulated frequency components;
  - the LO signal has a second plurality of frequency components; and
  - the receiver is adapted to phase-lock at least one frequency component of the second plurality to a corresponding frequency component of the first plurality.

36. A method of receiving quantum information at a receiver of a communication system having a transmitter optically coupled to the receiver, the method comprising:
(A) receiving a quantum-information (QI) signal generated by the transmitter using a first optical source; and
(B) phase-locking to the QI signal a local oscillator (LO) signal generated using a second optical source, wherein:
for step (A), the QI signal comprises a training signal; and
step (B) comprises:
- determining a reference phase shift for the LO signal based on the training signal; and
- phase-shifting the LO signal using the reference phase shift to achieve the phase lock.

37. The invention of claim 36, wherein step (B) comprises:
generating a probability distribution function corresponding to the training signal; and
determining the reference phase shift based on the probability distribution function.

38. The invention of claim 37, wherein step (B) comprises:
generating a plurality of probability distribution functions corresponding to the training signal using sliding-window processing; and
adaptively adjusting the reference phase shift based on said plurality of probability distribution functions.

39. The invention of claim 37, wherein step (B) comprises:
determining a distribution average for the probability distribution function; and
determining the reference phase shift based on the distribution average.

40. The invention of claim 39, comprising adaptively tracking a null of the distribution average.

41. The invention of claim 36, wherein the training signal comprises a known sequence of bits encoded using a known basis-set selection.

42. The invention of claim 41, wherein:
the known sequence of bits corresponds to a first basis set and a single bit value; and
step (B) comprises selecting a second basis set, different from the first basis set, for the determination of the reference phase shift.

43. A method of receiving quantum information at a receiver of a communication system having a transmitter optically coupled to the receiver, the method comprising:
(A) receiving a quantum-information (QI) signal generated by the transmitter using a first optical source; and
(B) phase-locking to the QI signal a local oscillator (LO) signal generated using a second optical source, wherein:
for step (A), the QI signal has one or more pilot frequency components, each characterized by a corresponding optical frequency, wherein each pilot frequency component carries a training signal;
for step (B), the LO signal has one or more pilot frequency components having the one or more optical frequencies;
for each pilot frequency component of the LO signal, step (B) comprises:
determining a reference phase shift based on the training signal; and
phase-shifting the pilot frequency component of the LO signal using the reference phase shift.

44. The invention of claim 43, wherein, for at least one frequency component of the LO signal having a signal frequency other than one of the optical frequencies of the one or more pilot frequency components, step (B) comprises determining a reference phase shift based on the one or more reference phase shifts determined for the one or more pilot frequency components of the LO signal.

45. The invention of claim 43, wherein, in addition to the one or more pilot frequency components, each of the QI and LO signals has one or more quantum-key-distribution (QKD) frequency components, wherein the method comprises receiving quantum key data, in parallel with the one or more training signals, using said QKD frequency components.

46. The invention of claim 45, comprising changing over time allocation of a frequency component as a pilot or QKD frequency component.

47. The invention of claim 46, comprising changing the allocation based on a condition of a transmission link via which the QI signal is transmitted.

48. A method of receiving quantum information at a receiver of a communication system having a transmitter optically coupled to the receiver, the method comprising:
(A) receiving a quantum-information (QI) signal generated by the transmitter using a first optical source; and
(B) phase-locking to the QI signal a local oscillator (LO) signal generated using a second optical source, wherein:
the QI signal is a frequency-multiplexed QI signal having a first plurality of independently modulated frequency components; and
the LO signal has a second plurality of frequency components, wherein at least one frequency component of the second plurality is phase-locked to a corresponding frequency component of the first plurality.

49. The invention of claim 48, wherein each frequency component of the first plurality alternates between carrying a respective training signal and a respective signal having quantum key data.

50. The invention of claim 49, wherein, for at least a first period of time, all frequency components of the first plurality carry training signals and, for at least a second period of time, all frequency components of the first plurality carry respective signals having quantum key data.

51. A communication system for transmission of quantum information, comprising a transmitter optically coupled to a receiver, wherein:
the receiver is adapted to:
receive a quantum-information (QI) signal generated by the transmitter using a first optical source; and
phase-lock to the QI signal a local oscillator (LO) signal generated using a second optical source;
the transmitter is adapted to independently modulate frequency components of a first plurality of frequency components to make the QI signal a frequency-multiplexed QI signal;
the LO signal has a second plurality of frequency components; and
the receiver is further adapted to phase-lock at least one frequency component of the second plurality to a corresponding frequency component of the first plurality.

52. The invention of claim 51, wherein the transmitter is further adapted to alternate each frequency component of the first plurality between carrying a respective training signal and a respective signal having quantum key data.

53. The invention of claim 52, wherein the transmitter is further adapted to modulate the frequency components so that, for at least a first period of time, all frequency components of the first plurality carry training signals and, for at least a second period of time, all frequency components of the first plurality carry signals having quantum key data.

* * * * *